United States Patent

Brown

[11] Patent Number: 5,595,213
[45] Date of Patent: Jan. 21, 1997

[54] QUICK CONNECTOR WITH CHECK VALVE

[75] Inventor: Lanny Brown, Lexington, Mich.

[73] Assignee: Huron, Inc., Lexington, Mich.

[21] Appl. No.: 368,661

[22] Filed: Jan. 4, 1995

[51] Int. Cl.$^6$ .................................... F16K 15/04
[52] U.S. Cl. .................... 137/515.5; 137/539.5; 285/321
[58] Field of Search .............. 137/515.5, 539.5; 285/321

[56] References Cited

U.S. PATENT DOCUMENTS

| | | | |
|---|---|---|---|
| 2,038,870 | 4/1936 | Rader et al. | 285/287 |
| 2,339,101 | 1/1944 | Parker | 137/515.5 X |
| 2,481,713 | 9/1949 | Bertra | 137/515.5 |
| 2,630,337 | 3/1953 | Snyder et al. | 251/149.2 |
| 2,944,840 | 7/1960 | Wiltse | 285/232 |
| 2,945,508 | 7/1960 | Schweisthal | 137/539.5 X |
| 3,222,091 | 12/1965 | Marshall | 285/95 |
| 3,637,239 | 1/1972 | Daniel | 285/321 X |
| 3,667,785 | 6/1972 | Kapeker | 285/231 |
| 3,791,406 | 2/1974 | Philipps | 137/515.5 |
| 3,880,130 | 4/1975 | Hecht | 137/539.5 X |
| 4,060,219 | 11/1977 | Crawford | 251/149.6 |
| 4,105,226 | 8/1978 | Frey et al. | 285/175 |
| 4,195,661 | 4/1980 | Takeuchi | 137/515.5 |
| 4,278,276 | 7/1981 | Ekman | 285/321 X |
| 4,431,218 | 2/1984 | Paul, Jr. et al. | 285/305 |
| 4,516,796 | 5/1985 | Hudson | 285/321 |
| 4,565,392 | 1/1986 | Vyse | 285/321 X |
| 4,615,547 | 10/1986 | Sutcliffe et al. | 285/136 |
| 4,690,436 | 9/1987 | Hehl | 285/321 |
| 4,828,297 | 5/1989 | Tarum | 285/305 |
| 4,842,309 | 6/1989 | LaVene et al. | 285/319 |
| 4,846,506 | 7/1989 | Bocson et al. | 285/4 |
| 4,863,202 | 9/1989 | Oldford | 285/321 |
| 4,979,721 | 12/1990 | Gilbert | 251/149.6 |
| 5,056,756 | 10/1991 | Norkey et al. | 251/149.6 |
| 5,215,122 | 6/1993 | Rogers et al. | 251/149.6 X |

FOREIGN PATENT DOCUMENTS 23451149  11/1971  Germany.
91540    4/1958   Norway.

Primary Examiner—John Rivell
Attorney, Agent, or Firm—Harness, Dickey & Pierce

[57] ABSTRACT

A fluid connector assembly includes a male member, a female member and a one-way check valve. A first resilient elastomeric member is disposed between the male and female members for retaining the connection between the two members. A second resilient elastomeric member is disposed between the male and female members for sealing the connection between the two members. The one-way check valve is disposed between the male and female members to prohibit fluid flow through the connector assembly in one direction when the male and female members are coupled together.

12 Claims, 1 Drawing Sheet

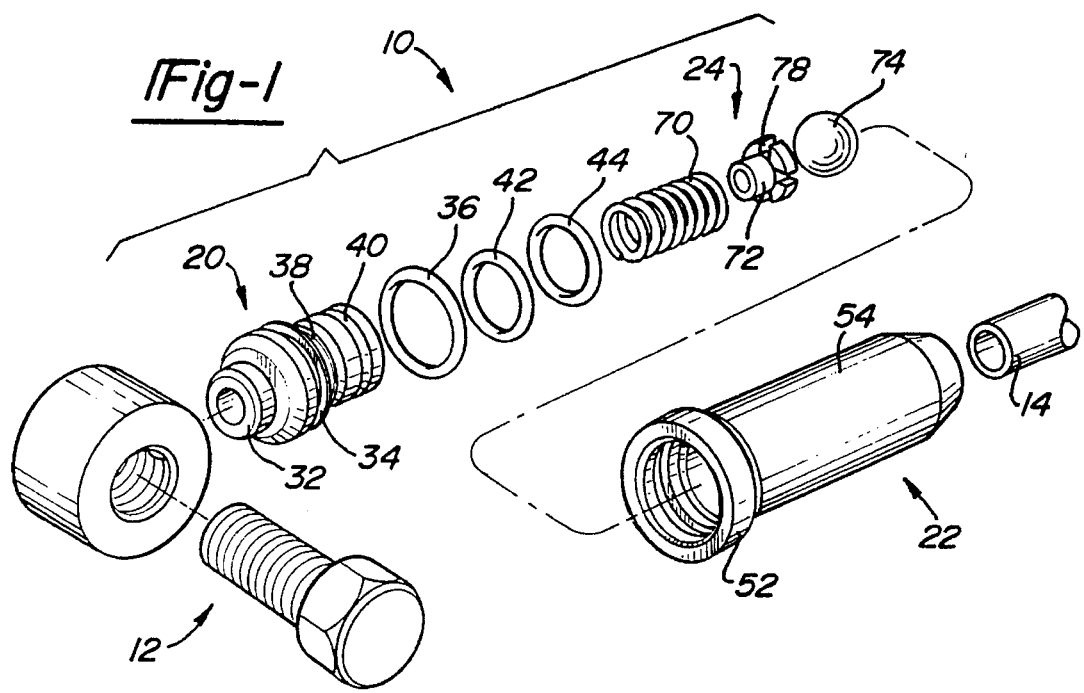
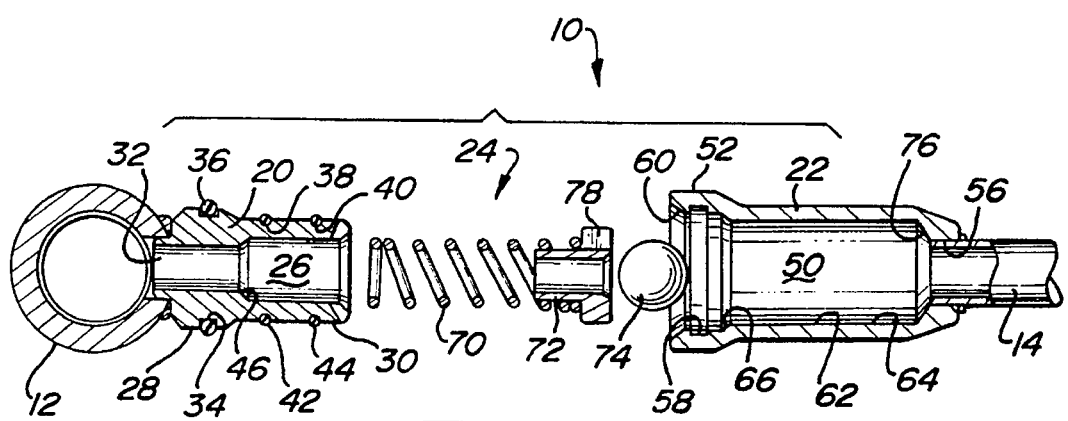
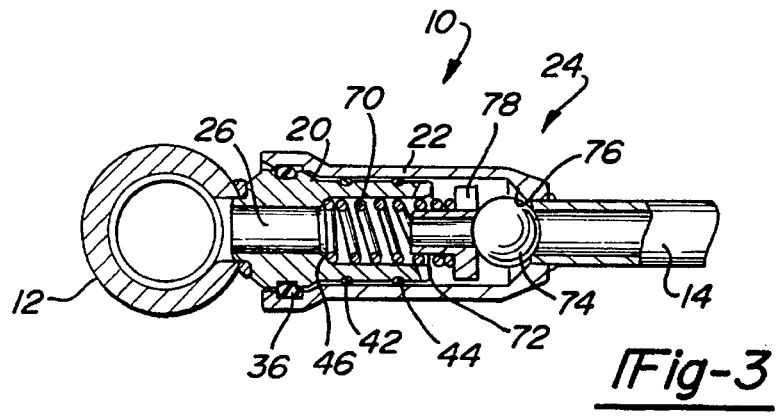

5,595,213

QUICK CONNECTOR WITH CHECK VALVE

FIELD OF THE INVENTION

The present invention relates generally to fluid conduit connectors or coupling devices. More particularly, the present invention relates to fluid conduit connectors of couplings adapted for quickly and conveniently connecting a pair of fluid conduits. The connector of the present invention incorporates an integral one-way check valve.

BACKGROUND OF THE INVENTION

Quick connect type connectors are old in the art and they are normally used for quickly and conveniently placing a pair of fluid conduits in fluid communication with one another. One type of prior art quick connect coupling includes an external, generally U-shaped staple or spring clip inserted into lateral openings in an assembled coupling for purposes of interlocking the various components of the coupling to one another. Frequently, however, such staples or clips become misplaced or permanently damaged due to repeated assembly and disassembly of the coupling and thus must be replaced. In addition, such staples or clips frequently protrude outwardly from the coupling to an extent that they can easily snag on, or interfere with, other adjacent components or devices.

Other prior art fittings or couplings require external clamps or rings for compressing a flexible fluid conduit onto a nipple-like structure. These compression fittings are frequently very time-consuming to install or remove during connection or disconnection of the fluid conduit. Similar to the staples and clips described above, external clamps or rings often become misplaced or permanently damaged and therefor must also frequently be replaced.

Still other well-known prior art couplings include male and female coupling elements that are threadably connectable to one another. Such threaded couplings, which typically rely upon the threaded engagement of the coupling elements both for mechanical interconnection and for fluid sealing, are frequently susceptible to leakage, thereby requiring application of sealing compounds or tape-like sealants to the threads each time the coupling elements are connected to one another.

Numerous other designs of fluid couplings have been proffered, each with their own advantages and disadvantages. The continued development of fluid couplings and connectors is directed towards providing a low cost, compact and simplified coupling or connector which overcomes the disadvantages of the prior art while simultaneously providing increased flexibility and features for the coupling or connector.

SUMMARY OF THE INVENTION

The present invention provides the art with a unique and improved fluid connector assembly. The connector of the present invention comprises a tubular male member having at least one sealing groove and at least one retaining groove formed into the outside diameter of the member. A separate resilient polymeric O-ring is disposed within both the sealing groove and the retaining groove. A tubular female member has an internal bore designed to sealingly engage the O-ring disposed within the sealing groove and the internal bore defines an additional retaining groove which engages the O-ring disposed within the male member's retaining groove to retain the assembly of the male and female members. A one-way check valve is disposed between the male and female members and operates to allow fluid flow in one direction only when the coupling is assembled.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 1 is an exploded perspective view of a connector in accordance with the present invention;

FIG. 2 is a side elevational view, partially in cross section, of the connector shown in FIG. 1 in a disassembled condition including the one-way check valve; and FIG. 3 is a side elevational view, partially in cross section, of the connector shown in FIG. 1 in an assembled condition including the one-way check valve.

DESCRIPTION OF THE PREFERRED EMBODIMENT

Referring now to the drawings in which like reference numerals designate like or corresponding parts throughout the several views, there is shown in FIGS. 1 through 3 a fluid connector in accordance with the present invention which is designated generally by the reference numeral 10. For exemplary purposes, connector 10 is illustrated in FIGS. 1 through 3 fluidly connecting a banjo fitting 12 to a fluid tube 14. It is to be understood that connector 10 of the present invention can be utilized to fluidly connect any of the known various types of components utilized in a fluid circuit.

Connector 10 comprises a tubular male member 20, a tubular female member 22 and a one-way check valve assembly 24. Member 20 is a tubular member defining an internal bore 26 which is utilized for the flow of fluid through member 20. Member 20 includes a head portion 28 and a neck portion 30 extending from head portion 28. The end of head portion 28 opposite to neck portion 30 is adapted for mating with one of the two fluid carrying components being connected together. FIGS. 1 through 3 illustrate an annular collar 32 extending from head portion 28 which mates with banjo fitting 12. The connection between collar 32 and banjo fitting 12 is provided with a braze to securely and sealingly attach member 20 to banjo fitting 12. The exterior surface of head portion 28 is provided with a retaining groove 34 within which is disposed an O-ring 36. O-ring 36 is a resilient polymeric member which functions to retain the assembled connector 10 as will be described later herein. Neck portion 30 extends from head portion 28 and has an external diameter smaller than head portion 28. The exterior surface of neck portion 30 is provided with a pair of sealing ring grooves 38 and 40 within which is disposed a respective O-ring 42 and 44. O-rings 42 and 44 are a resilient polymeric member which functions to seal the connection between members 20 and 22. Internal bore 26 is a stepped bore which defines a spring seat 46 for mating with one-way check valve assembly 24 as will be discussed later herein.

Female member 22 is a tubular member defining an internal bore 50 which is utilized to mate with member 20, house one-way check valve assembly 24 and allow the flow of fluid through member 22. Similar to member 20, member 22 includes a head portion 52 and a neck portion 54 extending from head portion 52. The end of neck portion 54 opposite to head portion 52 is adapted for mating with one of the two fluid carrying components being connected together. FIGS. 2 and 3 illustrate an aperture 56 extending into neck portion 54 which mates with fluid tube 14. The connection between aperture 56 and fluid tube 14 is provided with a braze to securely and sealingly attach member 22 to fluid-tube 14. Internal bore 50 is a multi-stepped bore which cooperates with member 20 and check valve assembly 24 to provide for the features of connector 10. Head portion 52 defines an enlarged diameter portion of bore 50 which includes a retaining ring groove 58. Head portion 52 of member 22 mates with head portion 28 of member 20 in the assembled condition shown in FIG. 3. Groove 58 is designed to engage O-ring 36, as shown in FIG. 3, to retain the connection of members 20 and 22. The width of groove 58 is larger than the diameter of O-ring 36 in order to provide for axial movement of member 22 with respect to member 20 in the assembled and sealed position. The end of head portion 52 opposite to neck portion 54 includes a chamfer 60 which leads into bore 50 to aid in the assembly of members 20 and 22 by compressing O-ring 36 as members 20 and 22 are being assembled.

Neck portion 54 defines a reduced diameter portion of bore 50 which is divided into a sealing portion 62 and a clearance portion 64. Neck portion 54 of member 22 mates with neck portion 30 of member 20 in the assembled condition as shown in FIG. 3. Sealing portion 62 of bore 50 is sized to mate with and place a specified amount of compression on O-rings 42 and 44 in order to seal the connection between members 20 and 22. A chamfer 66 on bore 50 between head portion 52 and neck portion 54 aids in the assembly of members 20 and 22 by compressing O-rings 42 and 44 as members 20 and 22 are being assembled. Clearance portion 64 of bore 50 provides clearance for the operation of one-way check valve assembly 24.

One-way check valve assembly 24 is disposed between member 20 and member 22 and is comprised of a coil spring 70, a valve body 72 and a ball 74. Coil spring 70 is disposed within bore 26 of member 20 and reacts against spring seat 46 in order to place check valve assembly 24 into its normally closed position. Valve body 72 mates with coil spring 70 and ball 74. Ball 74 is urged by coil spring 70 against a valve seat 76 located between clearance portion 64 and aperture 56 on member 22. In the assembled condition, valve body 72 and ball 74 can move axially within clearance portion 64 of bore 50 of member 22 against the load being exerted by coil spring 70. Thus, the pressure at which one-way check valve 24 will allow fluid flow can be controlled by the size of coil spring 70 and the size of valve seat 76.

Thus in the assembled condition, as shown in FIG. 3, fluid flow from member 20 through member 22 is prohibited by ball 74 being urged against valve seat 76 by coil spring 70. Fluid flow from member 22 through member 20 will be permitted when the pressure of the fluid being supplied to member 22 through fluid tube 14 is sufficient to overcome the biasing load of coil spring 70 and unseat valve body 72 from valve seat 76. Valve body 72 is provided with a plurality of slots 78 which allow fluid flow in the event the fluid pressure exerts a sufficient load on ball 74 and valve body 72 to seat valve body 72 against member 20.

The assembly of connector 10 comprises the steps of first attaching members 20 and 22 to the appropriate fluid carrying components. (Banjo fitting 12 and fluid tube 14 for exemplary purposes). Next, O-rings 36, 42 and 44 are positioned within grooves 34, 38 and 40 respectively, valve body 72 is mated with coil spring 70 and these components along with ball 74 are placed either in member 20 or in member 22 in the correct order. Finally, member 22 coaxially engages member 20 which causes chamfer 66 to engage O-rings 42 and 44 and chamfer 60 to engage O-ring 36 as members 20 and 22 are moved axially with respect to each other. Eventually, O-ring 36 will engage groove 58 which retains the connection between members 20 and 22. O-rings 42 and 44 are compressed against sealing portion 62 of bore 50, ball 74 is seated against valve seat 76 and connector 10 is in the assembled condition operating to control the flow of fluid through connector 10 as described above.

While the above detailed description describes the preferred embodiment of the present invention, it should be understood that the present invention is susceptible to modification, variation and alteration without deviating from the scope and fair meaning of the subjoined claims.

What is claimed is:

1. A threadless fluid connector assembly for fluidically connecting a first and a second fluid carrying device, said threadless fluid connector comprising:

a first member fluidically connected to said first fluid carrying device, said first fluid member including a head and a neck extending from said head, a stepped bore extending through said first member, said stepped bore having a first small diameter portion and a second larger diameter portion separated by a seat;

at least one peripheral groove in said neck;

at least one peripheral groove in said head a first resilient elastomeric member adapted to be received in said groove of said neck;

a second resilient elastomeric member adapted to be received in said groove of said head;

a second member fluidically connected to said second fluid carrying device, said second member having a bore therethrough adapted to be received by said extending neck, said bore having a first portion adapted to be coupled with one of said resilient elastomeric members for sealing said second member with said first member and a second portion adapted to be coupled with said other resilient elastomeric member for retaining said second member on said first member; and a one-way check valve disposed within said bore between said first member and said second member, a portion of said one-way check valve seating on said seat in said larger diameter portion of said stepped bore and said one-way check valve prohibiting fluid flow in one direction when said first member is coupled to said second member.

2. The fluid connector assembly according to claim 1 wherein said first member includes a peripheral step portion disposed between said head and said neck.

3. The fluid connector assembly according to claim 1 wherein said second member further comprises a sleeve portion having an inner periphery defining said first portion of said bore, said sleeve portion being adapted at one end to mate with a fluid carrying component.

4. The fluid connector assembly according to claim 1 wherein said head is adapted to mate with a fluid carrying component.

5. The fluid connector assembly according to claim 1 wherein said one-way check valve comprises a ball and a spring disposed within said bore of said second member.

6. A threadless fluid connector assembly comprising:

a male member having a head portion and a neck portion, said head portion defining a first peripheral groove, said neck portion defining a second peripheral groove, a stepped bore extending through said male member, said stepped bore having a first small diameter portion and a second larger diameter portion separated by a seat;

a first and second resilient elastomeric member adapted to be received in said first and second peripheral grooves, respectively;

a female member having a bore therethrough and having a head portion and a neck portion, said neck portion of said female member adapted to be coupled with said second resilient member for sealing said female member with said male member, said head portion of said female member adapted to be coupled with said first resilient member for retaining said female member on said male member; and a one-way check valve disposed within said bore between said male member and said female member, a portion of said one-way check valve seating on said seat in said larger diameter portion of said stepped bore and said one-way check valve prohibiting fluid flow in one direction when said male member is coupled to said female member.

7. The fluid connector assembly according to claim 6, wherein said one-way check valve comprises a valve body and a biasing member.

8. The fluid connector assembly according to claim 7 wherein said one-way check valve further comprises a ball which mates with a valve seat disposed on said female member.

9. The fluid connector assembly according to claim 7, wherein said biasing member is disposed within said bore of said female member.

10. The fluid connector assembly according to claim 6, wherein said one-way check valve comprises a ball and a biasing member, said biasing member being disposed within said stepped bore of said male member.

11. The fluid connector assembly according to claim 6, wherein said male member is adapted at one end to mate with a fluid carrying component.

12. The fluid connector assembly according to claim 6, wherein said female member is adapted at one end to mate with a fluid carrying component.

* * * * *